United States Patent
Uesugi et al.

[11] Patent Number: 5,285,684
[45] Date of Patent: Feb. 15, 1994

[54] SHAPE DETECTING ROLL

[75] Inventors: Kenichi Uesugi, Kobe; Toshiyuki Sasaki, Kakogawa, both of Japan

[73] Assignee: Kabushiki Kaisha Kobe Seiko Sho, Kobe, Japan

[21] Appl. No.: 667,396

[22] PCT Filed: Jul. 27, 1990

[86] PCT No.: PCT/JP90/00959
§ 371 Date: Mar. 28, 1991
§ 102(e) Date: Mar. 28, 1991

[87] PCT Pub. No.: WO91/02231
PCT Pub. Date: Feb. 21, 1991

[30] Foreign Application Priority Data

Jul. 28, 1989 [JP] Japan .................. 1-197298

[51] Int. Cl.⁵ ............................................. G01L 5/00
[52] U.S. Cl. ..................... 73/159; 33/501.03
[58] Field of Search ............ 33/501.02, 501.03, 561.1, 33/711; 73/159

[56] References Cited

U.S. PATENT DOCUMENTS

| | | | |
|---|---|---|---|
| 3,890,209 | 6/1975 | Shigeta et al. | 204/129.95 |
| 3,902,363 | 9/1975 | Ishimoto . | |
| 4,439,303 | 3/1984 | Cocchi | 204/434 |
| 4,542,077 | 9/1985 | Ogata et al. | 428/629 |
| 4,729,729 | 3/1988 | Tarumoto et al. | 428/666 |

FOREIGN PATENT DOCUMENTS

| | | |
|---|---|---|
| 2310552 | 9/1973 | Fed. Rep. of Germany . |
| 49-24464 | 3/1974 | Japan . |
| 56-82424 | 7/1981 | Japan . |
| 317699 | 12/1988 | Japan . |

*Primary Examiner*—Thomas B. Will
*Attorney, Agent, or Firm*—Oblon, Spivak, McClelland, Maier & Neustadt

[57] ABSTRACT

The present invention relates to a shape detecting roll rotatable for supporting a traveling rolled material over the width thereof to detect the pressure of the rolled material from portion to portion widthwise thereof and detect the shape of the rolled material by processing the detected pressure by calculation. The roll comprises a plurality of disks (2) arranged axially of the roll concentrically with one another and each having a pressure sensor (1) incorporated in its peripheral portion, a clearance (11) being formed between the side surfaces of peripheral portions of the adjacent disks (2) for preventing the interference between the peripheral portions. The side surfaces of the disk peripheral portions (10) forming the clearance (11) are activated by a reverse electrolytic treatment and thereafter coated with a corrosion-resistant plating. The plating film firmly adheres to the surfaces of the disks, protecting the side surfaces of the disk peripheral portions against corrosion and assuring the roll of high detection accuracy for a prolonged period of time.

8 Claims, 1 Drawing Sheet

SHAPE DETECTING ROLL

TECHNICAL FIELD

The present invention relates to a roll for detecting the elongation (shape) of rolled materials from portion to portion widthwise thereof.

BACKGROUND ART

A method is known of detecting the shape of traveling rolled materials (mainly rolled strip) widthwise thereof by detecting the pressure of the rolled material from portion to portion widthwise thereof with a rotating roll supporting the rolled material over the width thereof and determining the tension and therefore the elongation of the widthwise portions from the pressure.

Such shape detecting rolls are disclosed in Unexamined Japanese Patent Publication SHO 56-82424, etc. An example of such roll will be described with reference to FIGS. 1 to 3.

The illustrated roll comprises a plurality of disks 2 held between a pair of stationary plates 3 on opposite sides and each having a pressure sensor 1 incorporated therein close to its periphery. The disks 1 are arranged axially of the roll concentrically with one another and joined together by tie rods 4. An end member 6 having a projecting roll shaft 5 is fixed to each end of the disk assembly concentrically therewith. The roll shaft 5 is rotatably supported by a bearing.

Each disk 2 has an annular portion 8 positioned inwardly of its peripheral portion and provided on opposite sides thereof with faces 9 for contact with the respective disks adjacent thereto. The pressure sensor 1 is accommodated between the disk peripheral portion 10 and the periphery of the annular portion 8. To assure the pressure sensor 1 of accurate detection, a clearance 11 of about 0.1 mm is provided between the peripheral portions 10 of the adjacent disks for preventing the interference between the peripheral portions 10. A seal groove 12 is formed in each side surface of the peripheral portion 10, and a seal ring 13 is fitted in the seal groove 12 for preventing a coolant or the like from penetrating into the sensor accommodating chamber 14 through the clearance 11. Indicated at 15 in FIG. 3 are holes for reducing $GD^2$.

Conventionally, the disks 2 are made of SCM material. The disks 2 are plated to obviate the likelihood that the side surfaces of the disk peripheral portions 10 will be corroded to close the clearance 11 if the roll is installed in a line wherein a rolling oil (soluble oil) containing a large amount of water is used or in a seaside area where the roll is exposed to the air containing salt. Thus, the side surfaces of the peripheral portions 10 defining each clearance 11 are coated with a corrosion-resistant plating film.

With the rolling conditions becoming severer in recent years, the pressure detecting roll has been placed into frequent use. To meet the need to give improved abrasion resistance to the roll, steel materials containing large quantities of special components, such as V and Nb, are used for making the disks.

However, if the disk is made of the steel material which permits presence of tough oxides or compounds of special elements, the disk surface can not be fully activated merely by acid pickling or degreasing which is usually conducted as a pretreatment before plating, with the result that the plating is very poor in adhesion and fails to serve for a long period of time.

An object of the present invention, which has been accomplished in view of the above problem, is to provide a shape detecting roll comprising disks which are coated with a corrosion-resistant plating over the side surfaces of the peripheral portions thereof forming a clearance between the adjacent disks, the plating being resistant to peeling regardless of the material used for the disks so as to give high durability to the roll.

DISCLOSURE OF THE INVENTION

To fulfill the above object, the present invention provides the following technical means.

More specifically, the invention provides a shape detecting roll rotatable for supporting a traveling rolled material over the width thereof to detect the pressure of the rolled material from portion to portion widthwise thereof, the roll comprising a plurality of disks 2 arranged axially of the roll concentrically with one another and each having a pressure sensor 1 incorporated in its peripheral portion, a clearance 11 being formed between the side surfaces of peripheral portions of the adjacent disks 2 for preventing the interference between the peripheral portions, the roll being characterized in that the side surfaces of the disk peripheral portions 10 forming the clearance 11 are activated by a reverse electrolytic treatment and thereafter coated with a corrosion-resistant plating.

The disks are made of SCM material, or an abrasion-resistant steel material containing one or at least two of Cr, Si, Mo, V, Nb, Cu, Ni, W, Co, Ti, Zr, etc. in a total amount of at least 7 wt. % as reinforcing or hardening alloy components.

The reverse electrolytic treatment is conducted with use of a bath of chromic acid and sulfuric acid in mixture, and electroless Ni-P plating is conducted for forming the corrosion-resistant plating.

With the shape detecting roll of the present invention, the side surfaces of the disk peripheral portions for forming a clearance for ensuring accurate detection are subjected to the reverse electrolytic treatment before the side surfaces are coated with a corrosion-resistant plating, so that even if tough oxides or compounds which are not decomposed by acid pickling are formed on the disk surfaces, these compounds are readily removed on decomposition for the activation of the surfaces. The activated surfaces are thereafter coated with the corrosion-resistant plating, which can therefore be firmly adhered to the disk surfaces. Consequently, even if a soluble oil or the like penetrates into the clearance, the side surfaces of the disk peripheral portions remain free of corrosion over a long period of time to prevent closing of the clearance, assuring the roll of very accurate detection over a prolonged period of time.

BEST MODE OF CARRYING OUT THE INVENTION

Embodiments of the invention will be described below with reference to the drawings.

Figure 1:
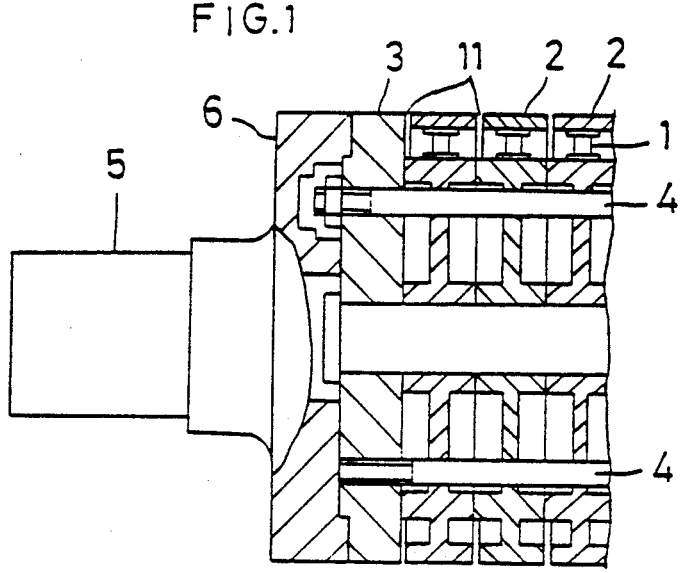
FIG. 1 is a fragmentary view in section showing the construction of a shape detecting roll embodying the present invention.
Figure 2:
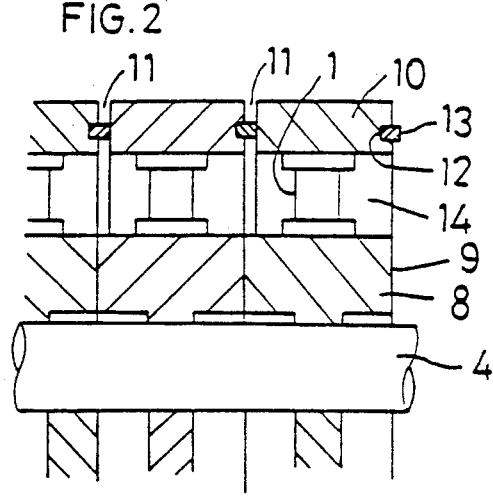
FIG. 2 is a fragmentary enlarged view of the peripheral portions of disks arranged side by side to provide the roll.
Figure 3:
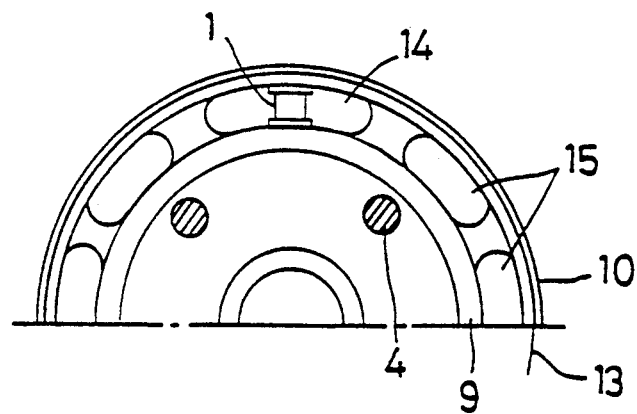
FIG. 3 is a plan view of a half portion of the disk.

The shape detecting roll of the invention has basically the same construction as the conventional one. The invention can be applied to rolls of any construction insofar as the side surfaces of peripheral portions of the adjacent disks form a clearance therebetween for preventing the impairement of pressure detection accuracy due to the interference between the peripheral portions. For example, the clearance may have a length corresponding to the size of the pressure sensor accommodating chamber (indicated at 14 in FIG. 3). Further the disk peripheral portions (indicated at 10 in FIG. 2) may be outwardly tapered so that the clearance is enlarged outward.

The material for the disks is not limited to SCM material but may be an abrasion-resistant steel material containing one or at least two of Cr, Si, Mo, V, Nb, Cu, Ni, W, Co, Ti, Zr, etc. in a total amount as large as at least 7 wt. % which are reinforcing or hardening alloy elements. Given below are composition (unit: wt. %) examples (1) to (3) of the material. The steel material is disclosed in Unexamined Japanese Patent Application SHO 59-179762.

| (1) C: 0.75–1.75% | Si: 0.5–3.0% |
|---|---|
| Mn: 0.1–2.0% | Cr: 5.0–11.0% |
| Mo: 1.3–5.0% | V: 0.1–5% |
| Balance: substantially Fe | |

(2) A composition corresponding to the composition (1) wherein the Fe is partly replaced by one or at least two elements selected from the following group to give improved strength and toughness.

| REM: 0.001–0.5% | Cu: 0.1–2.0% |
|---|---|
| Ni: 0.1–2.0% | W: 0.1–2.0% |
| Co: 0.1–5.0% | Nb: 0.01–3.0% |
| Ti: up to 2.0% | Zr: up to 2.0% |

(3) A composition corresponding to the composition (1) or (2) wherein the Fe is partly replaced by one or at least two elements selected from the following group to afford improved cuttability.

| S: up to 0.20% | Pb: up to 0.40% |
|---|---|
| Se: up to 0.30% | Bi: up to 0.50% |
| Te: up to 0.30% | Ca: 0.002–0.01% |

To produce the shape detecting roll of the present invention, the disks are prepared first by machining, subjected to heat treatments (usually, hardening and tempering) as contemplated, then degreased with a solvent, subjected to a reverse electrolytic treatment, thereafter pickled with an acid or electrolytically degreased as usually practiced and then plated. The term "reverse electrolytic treatment" refers to a treatment wherein the workpiece to be plated (the disk in the case of the invention) is made to serve as a positive electrode reverse to the polarity for electroplating, and the surface of the workpiece is forcibly dissolved out on decomposition by the passage of current. The plated disks are washed with water and dried to obtain finished disks. As the plating treatment, electroless Ni-P plating is usually conducted which affords excellent adhesion to steel materials and produces plating films having a uniform thickness, reduced in the number of pinholes and satisfactorily resistant to corrosion. The plated disks are assembled together along with the other parts, and the roll obtained has its peripheral surface polished.

If the reverse electrolytic treatment is conducted to excess, the disk surface becomes markedly rough, so that it is necessary to suitably adjust the concentration of the electrolytic bath, current passage time, voltage and current. When a bath of 200 g/liter of chromic acid and 2 g/liter of sulfuric acid in mixture is used, suitable treating conditions are, for example, as follows.

| Bath temperature: | 50–80° C. |
|---|---|
| Current: | 530–700 A |
| Voltage: | 10–17 V |
| Immersion time: | 5–20 minutes |

A specific production example is given below.

(1) An abrasion-resistant steel material having the composition listed in Table 1 below was machined to prepare disk workpieces, which were then heat-treated for hardening and tempering.

TABLE 1

| C | Si | Mn | Cr | Mo | V |
|---|---|---|---|---|---|
| 1.25 | 1.7 | 1.0 | 8.0 | 3.0 | 2.5 |

(Note)
unit: wt. %.
balance: substantially Fe.

(2) The disk workpieces were attached to jigs and then degreased with trichlene. The disk workpieces were suspended from the respective jigs, one from each jig, so as to be freely movable.

(3) Using a mixture bath of 200 g/liter of chromic acid and 2 g/liter of sulfuric acid, the workpieces were treated by reverse electrolysis under the following conditions.

| Bath temperature: | 55° C. | Immersion time: | 12 min. |
|---|---|---|---|
| Current: | 590 A | Voltage: | 10 V |

(4) After the reverse electrolytic treatments, the following substrate treatments were carried out in the order mentioned.

1. Dipping in hydrochloric acid, 2. washing with water, 3. electrolytic degreasing, 4. washing with water, and 5. dipping in hydrochloric acid.

(5) Next, the disk workpieces were dipped in a chloride bath for an Ni striking treatment and then subjected to an electroless Ni-P plating treatment. For this plating treatment, air was injected into the plating bath from the bottom for agitation and thereby expose every portion of the disk workpieces to the plating bath uniformly and smoothly. The treatment produced a plating with a thickness of 20 μm (irregularities in thickness: up to ±10%).

(6) The disks were washed with water, dried and then removed from the jigs. The plating was then tested for peeling. Since the usual bend test can not be conducted because of the great rigidiy of the substrate, the plating was tested by placing the tip of screwdriver on the disk surface at an angle of 30° C. therewith and pushing the driver forward with the greatest possible force while pressing the driver downward under the body weight of the operator.

In a comparative example, disks were prepared in the same manner as above employing an electroless Ni-P plating treateament except that the disk workpieces were immersed in fresh bath of concentrated nitric acid instead of the foregoing step (3). The plating was similarly tested for peeling.

Consequently, the plating film on the disk of the invention remained free of peeling no matter how the plating was pushed and despite many repetitions of the pushing stroke. On the other hand, the plating of the comparative example peeled off relatively easily when subjected to the pushing stoke several times although the workpiece was pickled with the strong acid, i.e., fresh concentrated nitric acid.

(7) Pressure sensors were installed in the disks of the invention, which were then arranged side by side with a seal ring interposed between the adjacent disks and assembled into a roll with roll shafts attached to the disk assembly. The surface of the roll was polished for finishing to obtain a pressure detecting roll contemplated.

INDUSTRIAL APPLICABILITY

The shape detecting roll of the present invention is usable in metal rolling processes.

We claim:

1. A shape detecting roll rotatable for supporting a traveling rolled material over the width thereof to detect the pressure of the rolled material from portion to portion widthwise thereof and detect the shape of the rolled material by processing the detected pressure by calculation, the roll comprising a plurality of disks arranged axially of the roll concentrically with one another and each having a pressure sensor incorporated in its peripheral portion, a clearance being formed between the side surfaces of peripheral portions of the adjacent disks for preventing the interference between the peripheral portions, the improvement comprising at least the side surfaces of the disk peripheral portions forming the clearance are activated by a reverse electrolytic treatment and thereafter coated with a corrosion-resistant plating.

2. A shape detecting roll as defined in claim 1 wherein the disks are made of chromium-molybdenum-steel material.

3. A shape detecting roll as defined in claim 1 wherein the disks are made of an abrasion-resistant steel material containing one or at least two of Cr, Si, Mo, V, Nb, Cu, Ni, W, Co, Ti, Zr, etc. in a total amount of at least 7 wt. % as reinforcing or hardening alloy elements.

4. A shape detecting roll as defined in claim 1 wherein the reverse electrolytic treatment is conducted with a bath of chromic acid and sulfuric acid in mixture.

5. A shape detecting roll as defined in claim 1 or 4 wherein the corrosion-resistant plating is an nickel-phosphorus plating.

6. The shape detecting roll of claim 1, wherein outer surfaces of the disk peripheral portions are activated by the reverse electrolytic treatment and thereafter coated with the corrosion-resistant plating.

7. A method for forming a shape detecting roll which is rotatable for supporting a traveling rolled material over the width thereof to detect the pressure of the rolled material from portion to portion widthwise thereof and detect the shape of the rolled material by processing the detected pressure by calculation, the roll comprising a plurality of disks arranged axially of the roll concentrically with one another and each having a pressure sensor incorporated in its peripheral portion, a clearance being formed between side surfaces of peripheral portions of the adjacent disks for preventing the interference between the peripheral portions, the method comprising:

activating the side surfaces of the disk peripheral portions forming the clearance by a reverse electrolytic treatment; and thereafter forming a corrosion-resistant plating upon said activated side surfaces.

8. The method of claim 7, wherein said plating step includes forming a nickel-phosphorus plating.

* * * * *